TWO-WAY MULTICHANNEL CARRIER WAVE TRANSMISSION

Filed July 26, 1950 4 Sheets-Sheet 1

INVENTOR
R. S. CARUTHERS
BY H. A. Burgess
ATTORNEY

Nov. 23, 1954 R. S. CARUTHERS 2,695,332

TWO-WAY MULTICHANNEL CARRIER WAVE TRANSMISSION

Filed July 26, 1950 4 Sheets-Sheet 2

INVENTOR
R. S. CARUTHERS
BY H. A. Burgess
ATTORNEY.

Nov. 23, 1954 R. S. CARUTHERS 2,695,332

TWO-WAY MULTICHANNEL CARRIER WAVE TRANSMISSION

Filed July 26, 1950 4 Sheets-Sheet 3

INVENTOR
R. S. CARUTHERS
BY H. A. Burgess
ATTORNEY

Nov. 23, 1954 R. S. CARUTHERS 2,695,332

TWO-WAY MULTICHANNEL CARRIER WAVE TRANSMISSION

Filed July 26, 1950 4 Sheets-Sheet 4

INVENTOR
R. S. CARUTHERS
BY H. A. Burgess
ATTORNEY 2,695,332

TWO-WAY MULTICHANNEL CARRIER WAVE TRANSMISSION

Robert S. Caruthers, Mountain Lakes, N. J., assignor to Bell Telephone Laboratories, Incorporated, New York, N. Y., a corporation of New York Application July 26, 1950, Serial No. 176,036

3 Claims. (Cl. 179—15)

This invention relates to multichannel carrier transmission for two-way communication.

Multichannel carrier systems are known utilizing four-wire transmission for the two directions of transmission. Such systems commonly use shielded circuits isolated from each other to prevent direct cross-talk or other such interaction therebetween. For this purpose, the shielding of circuits may involve placing them in separate cables or in properly shielded halves of the same cable.

In short haul carrier systems, particularly where cheapness is an important requirement, the cost of multiple cabling or expensive shielding may be excessive. The present invention permits use of a single cable, preferably one carrying numerous paralleling voice frequency circuits for short haul carrier four-wire transmission. The most serious problem arising in such a situation is cross-talk and, specifically, far-end, near-end, and interaction cross-talk.

An object of the invention is to eliminate interaction cross-talk at repeater stations in a multichannel carrier system.

Another object of the invention is to automatically equalize attenuation-frequency variations on the carrier pairs connected between repeater stations.

Another object of the invention is to reduce the amount of amplification required in a multichannel carrier system by eliminating equalizers and by averaging the losses in successive repeater sections.

A feature of the invention is frequency "frogging" of high and low frequency group allocations at the carrier repeaters to eliminate interaction cross-talk.

Another feature of the invention is the use of compandors built into the carrier terminals to improve cross-talk, to reduce noise interferences, to ease the discrimination requirements of all filters, and to permit higher level operation of all modulating and amplifying equipment without aggravating the modulation cross-talk, and to provide a frequency frogging carrier system which is both practical and inexpensive.

In accordance with the particular embodiment of the invention disclosed herein, a short haul multichannel carrier system for use on toll and exchange plant cables is provided employing transmitted-carrier double-side-band transmission. Within a single cable, directional separation is obtained by using two pairs and, in addition, utilizing different frequency bands for the two directions of transmission. At each repeater, frequency "frogging" or successive interchange of the high and low frequency bands involved in the two-way transmission is accomplished by frequency band shifting modulators. In effect, the frequency "frogging," as it applies to a single repeater section, involves a common frequency band for the input signals from both directions and likewise involves locating the output signals for the two directions in the other common frequency band. Frequency "frogging" results in the alternation back and forth or interchange of the high and low band of carrier transmission as it passes through successive repeaters, and it applies both to a single direction of transmission and to opposite directions of transmission. Concomitant with the frequency "frogging," there is produced at the first and oddnumbered repeaters an inversion in the order of channels. Thus, a 12-channel group, for example, which started out in the higher band with channel 1 at lowest frequency and channel 12 at highest frequency, is translated to the lower band with channel 12 at lowest frequency and channel 1 at highest frequency. At all even-numbered repeaters, the channels are restored to their original order.

As a result of the frequency "frogging" and channel order inversion, interaction cross-talk through voice frequency pairs located in the same cable as the carrier pairs and cross-talk between output and input of repeaters are substantially prevented. Over-all transmission in two consecutive repeater sections is practically equalized and made independent of frequency.

Compandors are built into such short haul carrier systems to minimize the noise and cross-talk requirements and to make the filter requirements less stringent. By the utilization of frequency frogging and the compandor, treatment of the cable, such as conventional cable balancing or the introduction of retardation coils or filters in the numerous voice frequency cable pairs not used for carrier, is avoided.

Heretofore, when a carrier system was to be added to a voice frequency cable, expensive apparatus had to be provided to make the cable good enough for carrier use. First, the carrier pairs in the cable must be balanced either at every repeater point or at most every third repeater by as many balancing coils as there are combinations of cross-talk paths between pairs. In a 20-pair cable, this might amount to 190 balancing coils in the voice pairs. Such a method would improve cross-talk less than 16 decibels. Moreover, when the carrier system is designed to use frequencies above 60 kilocycles in a cable, not only does the cross-talk before balancing become 6 decibels worse as the frequency is doubled, but also less and less improvement can be obtained by simple balancing coils, because the normally unbalanceable component gets larger at higher frequencies.

Another expensive method of making a voice frequency cable suitable for carrier operation involves inserting longitudinal noise suppression coils in all the voice pairs not used for carrier circuits. Such coils would be used at every repeater point that is in a telephone office, as the noise in the voice pairs is due to the high frequency components of telephone and telegraph signals or dial pulses. When a single cable is used, suppression coils must be used at every repeater point to prevent interaction cross-talk.

However, by building a compandor into the carrier terminal, for example, a compandor giving 25-decibel noise improvement, it has been found in the practice of the invention that the carrier transmission can go to a much higher frequency range, that frequency frogging is practical and inexpensive, and that the aforementioned balancing coils and suppression coils may be eliminated from the system with corresponding savings in expense.

Figure 1:
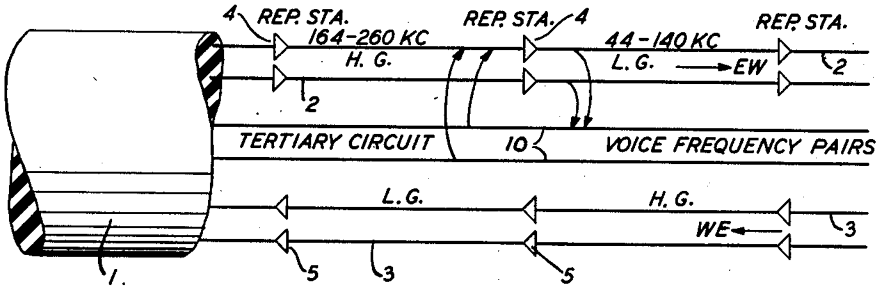
Fig. 1 is an explanatory diagram for expounding the principles of the invention and showing voice pairs and carrier pairs in a single cable.

Referring to Fig. 1, a two-way transmission system (E-W and W-E) by multichannel carrier is shown in a single cable 1, which also contains numerous voice frequency pairs 10 for collateral transmission of voice frequencies.

Figure 2:
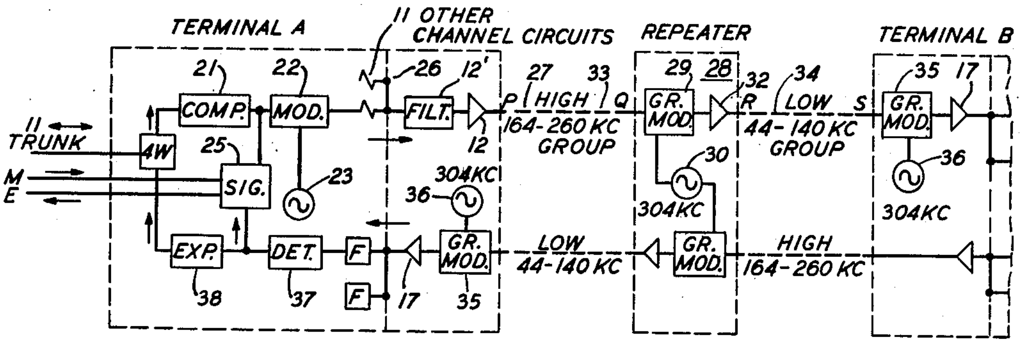
Fig. 2 is a simplified block diagram of a short haul, frequency frogging carrier system in accordance with the invention.

In one direction of carrier transmission (E-W), a pair of wires 2 in the same cable has a number of one-way repeating stations 4 spaced approximately 8 miles apart. In the opposite direction (W-E) of carrier transmission, a similar pair 3 and a similar number of repeating stations 5 with the same spacing are provided. Each repeater station contains repeating amplifiers and a group modulator (Fig. 4) for shifting the frequency input band thereto either from the high frequency band 164–260 kilocycles, for example, to the low frequency band 44–140 kilocycles, or conversely, as indicated in Figs. 1 and 2. The frequency band width of the high and low groups is the same.

In single cable transmission, as shown in Fig. 1, a serious problem of interaction cross-talk arises if the same band of carrier frequencies is relied upon for the two-way transmission. The arrows indicate the electromagnetic induction paths involving repeaters and voice pairs, which produce cross-talk. Mitigation of the cross-talk in a practical short haul carrier in accordance with the invention is obtained when modulators are used in each repeater to interchange or "frog" EW and WE frequency high and low group allocations at repeater input and output. Thus, cross-talk between carrier pairs and voice frequency pairs and cross-talk between one repeater output and the input of another may be largely nullified by the use of "frogged" bands of frequencies.

Frequency frogging, in addition to reduction in cross-talk, also makes the system self-equalizing, that is, the line slope in one repeater is exactly nullified as a consequence of the concomitant channel order inversion of the frequency spectrum and the transmission of the inverted channels over the next line section.

Fig. 2 is a simplified block schematic of a frequency frogging, multichannel carrier system. The two-way voice frequency transmission from the trunk circuit 11 is segregated at the hybrid network 4W, and the EW transmission is directed into the compressor 21, whose purpose is to compress speech signals having a wide range of volumes into a range of volumes approximately one half as great by amplifying weak signals considerably and attenuating strong signals slightly.

The compressed voice signals applied to the channel modulator 22, namely, a germanium varistor bridge unit, are modulated with a 168-kilocycle carrier from oscillator 23 to produce upper and lower sidebands around the carrier frequency and its harmonics. The unmodulated carrier frequency components of the channels are not suppressed but are transmitted with their respective sidebands.

The 3700-cycle signaling tone circuit 25 is connected to the trunk M and E leads, and the 3700-cycle tone is modulated on the same carrier as the voice signals, as is disclosed more fully in the United States application of F. S. Entz et al., Serial No. 175,898, filed July 26, 1950. Signaling over the multichannel carrier system is by means of this 3700-cycle tone, which lies outside the voice bands of 300–3100 cycles. This tone is generated by an oscillator which is common to the 12-channel terminal. The tone is continually transmitted over each channel during the idle condition. An off-hook signal over the "M" lead from the trunk circuit interrupts the tone. At the receiving end, the tone is detected, and direct-current indications are transmitted over the "E" lead to the trunk circuit. These indications correspond to the hook signals initiated at the other end. Dial pulses can be transmitted similarly from the "M" lead at one end to the "E" lead at the other.

The carrier terminal A consists of 12 channel units, each transmitting channel unit containing a germanium modulator 22 with individual carrier oscillators 23 for the modulators at 8-kilocycle intervals from 168–256 kilocycles. The 11 other channel circuits (not shown) are indicated as multipled at 26. Double sideband and carrier transmission are used for each channel.

The usual transmitting channel filters may be dispensed with in this double sideband transmission because of the advantages provided by it and the built-in compandor of the terminal A.

The frequency allocation of channels 1 to 12, inclusive, in the EW and WE direction of transmission is shown in the following table:

| Channel | Carrier frequency, kilocycles | |
|---|---|---|
| | (EW) | (WE) |
| 1 | 168 | 136 |
| 2 | 176 | 128 |
| 3 | 184 | 120 |
| 4 | 192 | 112 |
| 5 | 200 | 104 |
| 6 | 208 | 96 |
| 7 | 216 | 88 |
| 8 | 224 | 80 |
| 9 | 232 | 72 |
| 10 | 240 | 64 |
| 11 | 248 | 56 |
| 12 | 256 | 48 |

It should be noted that the sum of the EW and WE carrier frequencies for any given channel is a constant which is equal to the group oscillator frequency, in this instance, 304 kilocycles.

While 12-channel transmission is disclosed hereinabove for illustrative purposes, it should be understood that any suitable number of channels may be employed.

Figures 3A, 3B, 3C:
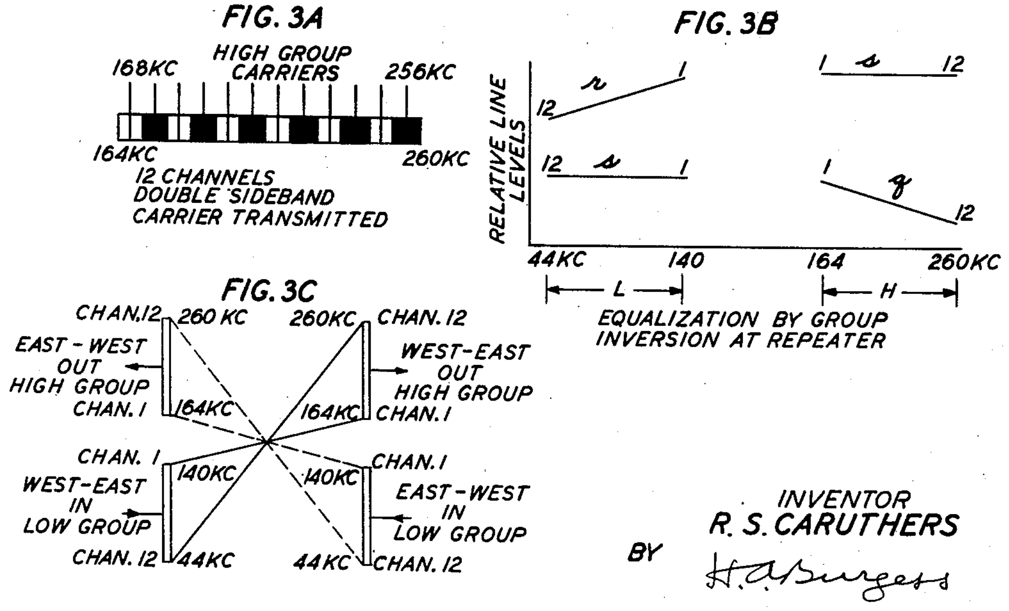
Fig. 3A is a chart showing the carrier allocations in the high frequency group or band.
Figs. 3B and 3C are charts showing equalization of transmission level provided by frequency "frogging" and inversion of channel order.

The 12 channels comprised in the high group or high frequency band 164–260 kilocycles (schematically represented in Fig. 3A), are applied to an amplifier 12 after the unwanted products of modulation involving harmonics of the carrier frequency are filtered out by filter 12'. The amplified frequency channels are thence transmitted over a two-wire line 27 in the single cable (Fig. 1) to a repeater station 28 approximately 8 miles distant from the terminal A. As seen above, the order of channel arrangement in the high group begins with channel 1 carrier at 168 kilocycles and channel 12 carrier at 256 kilocycles, and their respective sidebands are as illustrated in Fig. 3A.

At the repeater station, the high-to-low repeater 28 receives the 164–260 kilocycle signals from the line and converts them into the low group band of 44–140 kilocycles by the action of the group modulator 29.

The action, whereby the repeater transmits a different frequency band than it receives and interchanges the high (164–260 kilocycles) and low groups (44–140 kilocycles), is termed "frequency frogging."

This "frequency frogging" is accomplished by modulation in copper oxide modulator 29. In passing through the repeater, the 164–260 kilocycle input band is modulated by the group modulator 29 with the 304-kilocycle carrier derived from a quartz crystal controlled oscillator 30. The lower sideband of this modulation process is selected which, therefore, provides at the output of the repeater 28 the 44–104 low band of frequencies. In this manner, an interchange from high to low group is accomplished. The upper sideband derived from group modulator 29 is rejected.

Most of the equalization of the carrier transmission depends upon providing equal cable section lengths between repeaters and the use of "frequency frogging" at each repeater.

Simultaneous with the interchange of the groups by "frequency frogging," the order of the channels is inverted, i. e., channel 12, the highest (256 kilocycles) in the high group allocation, is transformed into the lowest (48 kilocycles) in the low group allocation. This transformation or channel order inversion results in a very nearly constant line loss with respect to frequency in the two line sections across the 12-channel group, and this nearly equalizes the line slope.

The low (44–140 kilocycle) band derived from the group modulator 29 is amplified by amplifier 32 and transmitted as the low group (L) over the pair in cable section 34, whose length corresponds to that of cable section 33.

Any desired number of repeater stations may be interposed between the terminal stations, but consecutive pairs of such repeater stations are characterized by the frequency "frogging" involved in translating either from the high group to the low group or conversely.

At the distant terminal B, the manner in which the low group of channels is received can be seen from considering the receiving branch of terminal A. The low band of 44–140 kilocycles is applied to a group modulator 35 to which a 304-kilocycle oscillator 36 is connected. The lower sideband of 164–260 kilocycles is selected and amplified at 17. The 12 channels (see Fig. 3A), which are contained in this 164–260 kilocycle band, are segregated by the channel filter F. The voice currents are then derived from a detector 37, and their volume is expanded in an expander 38 to be transmitted to the trunk circuit via a hybrid network 4W.

Fig. 3B is a chart of relative line levels as ordinates versus frequency and shows the equalization in line levels achieved by frequency frogging and group inversion at the repeaters.

Thus, starting with an initial condition of equal levels for the 12 channels at point P (Fig. 2), the line section PQ produces the slope *q* over the 164–260 kilocycle band. At R, the high and low groups are "frogged" and the order of channels inverted. The slope *r* is the inverse of the slope *q* due to the high group line section. The succeeding line section RS produces an almost equal slope at low group frequencies to that of *q*, which, when added to slope *r* results in slope *s*, which is the final equalized condition existing at S.

Fig. 3C shows diagrammatically the inversion of channel order which takes place in the group modulators at the various repeater stations.

Figure 4:
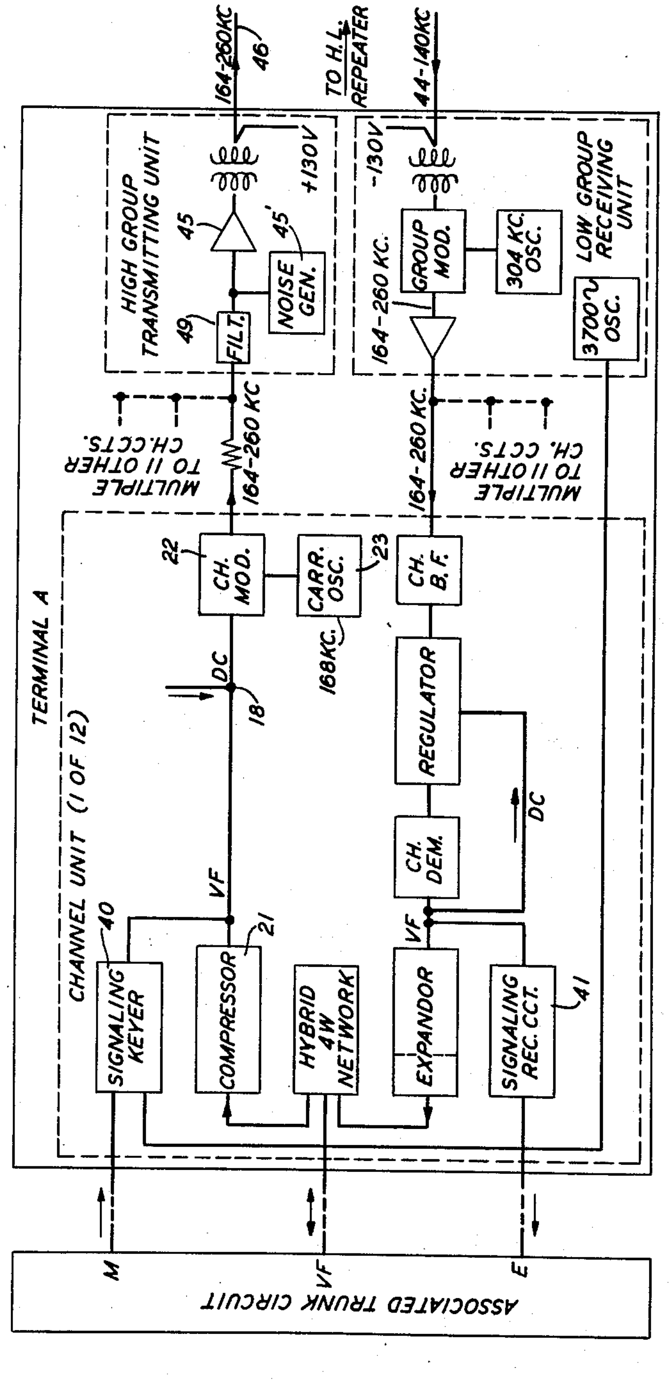
Figs. 4, 5, 6 are block diagrams of a multichannel carrier system in accordance with the invention, namely, showing the terminal stations and the intervening repeater stations thereof.

Fig. 4 shows in greater detail a terminal station A for a short haul multichannel carrier system, including the high group transmitting unit and low group receiving unit, shown in block diagram form.

As mentioned previously, the signaling keyer 40, the signaling receiving circuit 41, the M and E leads, and their relation to the trunk circuit are described in detail in the United States application of F. S. Entz et al. referred to hereinabove.

*Compressor*

The two-way voice frequency transmission VF from the associated trunk circuit is directed to the compressor circuit 21 by the hybrid network 4W.

The compressor 21 may be of the type disclosed in an article entitled "Vario-Losser Circuits," by W. R. Bennett and S. Doba in Electrical Engineering, vol. 60, pages 17 through 22, January 1941, or in United States Patent 2,018,489, issued October 22, 1935, to S. Doba.

The compressor circuit 21 essentially includes a vario-losser in the form of a germanium varistor bridge network and the usual voice frequency amplifier, rectifier control circuit, and low-pass filter circuit passing syllabic frequencies. It provides a balanced attenuator in the voice transmission circuit whose loss is adjusted automatically at a syllabic rate by the output voltage of the compressor so that high output signals cause relatively high loss, tending to reduce the output somewhat, and low output signals cause low loss, tending to increase the output to a relatively great extent. The rectifier control circuit in the compressor changes syllabic pulses of speech into spurts of direct current which control the insertion loss of the vario-losser.

*Channel modulator*

The direct current from the rectified speech envelope used to control the vario-losser in the compressor is also fed to the input of a well-balanced bridge varistor, used as the channel modulator 22.

Introduction of direct current at 18 to the modulator 22 at the speech terminal input unbalances the modulator to allow a corresponding amount of the unmodulated carrier wave to be transmitted along with the speech sidebands. This method is used to produce a transmitted carrier wave of correct phase for the speech sidebands.

By adjusting the direct-current input voltage to be equal to the peak of the speech voltage into the modulator, a transmitted carrier wave results that approximates continuous 100 per cent modulation by the peaks of the speech wave. The nearly 100 per cent modulated wave from the modulator is of low distortion because of the use of high carrier signal ratio.

The compressed voice signals and the 3700-cycle signaling tone are applied to the channel modulator 22. Modulation with a channel carrier of 168 kilocycles generated by carrier oscillator 23 is produced in a germanium varistor bridge unit similar to the type disclosed in Bell System Technical Journal, 1939, pages 315 through 337, in an article entitled "Copper Oxide Modulators, Etc." by R. S. Caruthers. During one-half cycle of the carrier, the polarity is such as to allow the voice signals to flow through the varistor, while in the other half cycle, the signals are blocked. This periodic interruption at carrier frequency produces upper and lower sidebands around the carrier. Unwanted products of modulation involving harmonics of the carrier frequency are suppressed by filter 49 in the transmitting group unit 45, which follows the channel modulator circuit.

The channel oscillator 23 is a crystal controlled, electron coupled vacuum tube type whose frequency is controlled by a quartz crystal and which is excited into oscillation by a feed-back path between screen and grid electrodes. Each channel has a separate carrier and a corresponding oscillator, as illustrated in Fig. 3A.

Twelve carriers and their sidebands are amplified by amplifier 45 to which a noise generator 45' is connected, as shown, in the high group transmitting unit and applied for transmission over a pair in a cable section 46 in the high group band of frequencies, 164–260 kilocycles. The cable sections are approximately 8 miles long and terminate in a high-low repeater 50.

The noise generator 45' in the transmitting unit consists of a resistance of 75,000 ohms, which supplies thermal-type noise for the purpose of masking intelligible cross-talk developed in connection with exchange-type cable. The masking noise voltage may be amplified in a tube before being introduced into the low level portion, i. e., at the input, of carrier amplifier 45, and the degree of its introduction may be controlled to any degree desired by a potentiometer or the like which adjustably varies the gain of the tube.

*Repeater stations*

Figure 5:
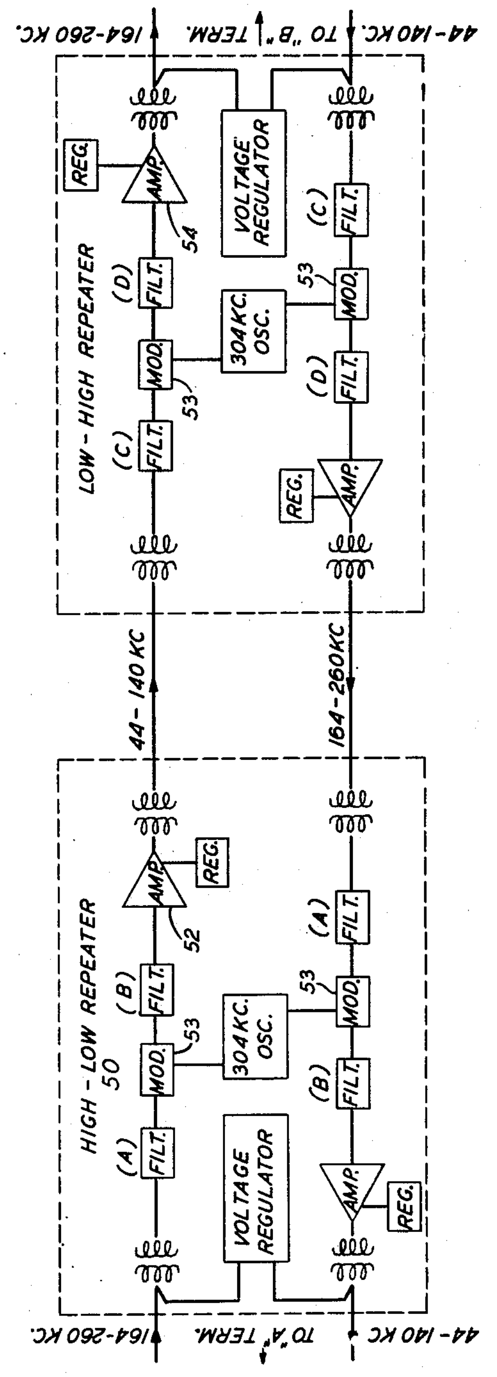

Fig. 5 shows a pair of repeater stations for two-way multichannel carrier transmission. It is important to note that the input frequency allocations are alike in the two opposite directions of transmission to a repeater. Similarly, the output frequency allocations are alike. It should also be noted that there is no overlap between the high and low groups.

In the illustration shown in Fig. 5, the high groups enter the repeater 50, and low groups leave it at its outputs. This has a great advantage in a single cable system which may contain hundreds of voice pairs in addition to the multichannel carrier pairs.

If a voice pair runs past the repeater point, cross-talk from the output of one repeater into the voice pair and back into the input of another repeater from the voice pair would encounter a change in frequency allocation due to the "frogging." The resulting difference in frequency bands used for transmission in itself tends to nullify the cross-talking induction. Another advantage of the "frogging" in this respect is that it obviates the expense of equipping several hundred voice pairs with chokes at each repeater point.

The repeaters 50, 51 are used on a four-wire basis to transmit along the cable pairs the speech and signals of a 12-channel system.

Two types of repeaters are used. They are designated high-low 50, H-L, and low-high 51, L-H. The H-L repeater 50 receives signals at high group frequencies from the line, translates them to low group frequencies, then suitably amplifies and regulates them for transmission at the desired output level. The L-H repeater 51 functions similarly, except it receives low group frequencies and transmits high group frequencies. Each repeater handles transmission in both directions. The two types of repeaters are used alternately along the high frequency line, and they are so nearly alike in respects other than frequency band that, except where specifically noted, the same discussion applies to both types.

The repeaters provide a nominal gain in each direction of 48 decibels for channel 1, with a residual slope across the band adjustable to about 0–2 decibels.

The appended tabulation compares the losses in successive cable sections for channel 1 and channel 12.

*Channel 1*

| | |
|---|---|
| Loss in 8-mile cable section at 168 kc | $\left(6.26\frac{db}{mi}\right)$=49.6 db |
| Channel 1 (168 kc.) passes through H-L repeater and comes out as 136 kc. | |
| Loss in next 8-mile cable section at 136 kc | $\left(5.8\frac{db}{mi}\right)$=46.4 db |
| Two successive cable sections—Total loss | 96 db |
| Half of the loss made up by a repeater | 48 db |

*Channel 12*

| | |
|---|---|
| Loss in 8-mile cable section at 256 kc | $\left(8\frac{db}{mi}\right)$=64 db |
| Channel 12 (256 kc.) passes through H-L repeater comes out at 48 kc. | |
| Loss in next 8-mile cable section at 48 kc | $\left(3.7\frac{db}{mi}\right)$=29.6 db |
| Two successive cable sections—Total loss | 93.6 db |
| Half of loss made up by a repeater | 46.8 db |

It also should be noted that in channel 12, although a 64-decibel loss was encountered in the first cable section, a repeated gain of 46.8 was adequate in view of the lower 29.6 loss in the next cable section attributable to the frequency "frogging."

In passing through a repeater, the signals are always modulated in a group modulator 53 with a common group carrier frequency and shifted from one band to the other frequency band, which is then amplified and applied to the line. To accomplish this, the input signals from the line are passed through an input filter (A) to remove unwanted frequencies, then modulated with a common carrier frequency, for example, the 304 kilocycles shown, to shift bands. The modulator output is passed through a second filter (B) to suppress carrier leak and the unwanted sideband. The output of the B filter, namely 44–140 kilocycles, is applied to the input of the regulating feedback amplifier 52. This amplifier automatically adjusts the gain by a thermistor regulator to maintain an output power that over the operating range is almost constant and independent of the input power.

Since most of the equalization is accomplished from having approximately equal cable lengths between repeaters and the use of "frequency frogging" at each repeater, the small amount of residual slope equalization may be compensated for by a Slope Adjuster control (not shown) in the amplifier 52.

The modulator filters used at the input and output of the group modulators 53 to select the desired frequency groups are designated A, B, C, and D and are assemblies of filter units of coil condenser combinations.

The input filter to a group modulator passes signals of the proper incoming group onto the modulator and rejects the unwanted group signals that are present at the repeater input due to cross-talk between the cable pairs. For instance, if the filter were not provided, direct near-end cross-talk would occur between the west output and the west input. For the H-L repeater 50, this filter is designated A and is a high-pass filter. For the L-H repeater 51, the input filter is designated C and is a low-pass filter.

The output filter from the modulator selects for transmission the lower sideband created by the group modulator and rejects the upper sideband, all other modulation products and the signals of the group applied at the input of the modulator. The output filter includes a peak section to provide attenuation to the 304-kilocycle carrier that is present due to imperfect modulator balance. For the H-L repeater, this filter is designated B and is a low-pass filter. For the L-H repeater, this filter is designated D. The filter D is a band-pass filter which passes 164–260 kilocycles and is used to reject the upper sideband from the modulator and the low group input frequencies.

The group modulator 53 is of the double balanced lattice type, wherein the input signal and carrier are both balanced from the output and consisting of copper-oxide varistors connected between repeating coils, such as disclosed in the United States Patent 1,959,459, issued May 22, 1934, to F. A. Cowen.

The amplifiers for the H-L and L-H repeaters are alike in circuit functions. A low group amplifier 52 is used in the H-L repeater, and a high group amplifier 54 is used in the L-H repeater. The amplifiers use two 408A pentode tubes stabilized by feedback and transformer coupled at both input and output. They have a thermistor flat gain adjustment and a slope control adjustment incorporated into the feedback circuit. The feedback circuit is connected into the amplifier as series feedback at the input and bridge type at the output, using a high side hybrid coil arrangement.

Figure 6:
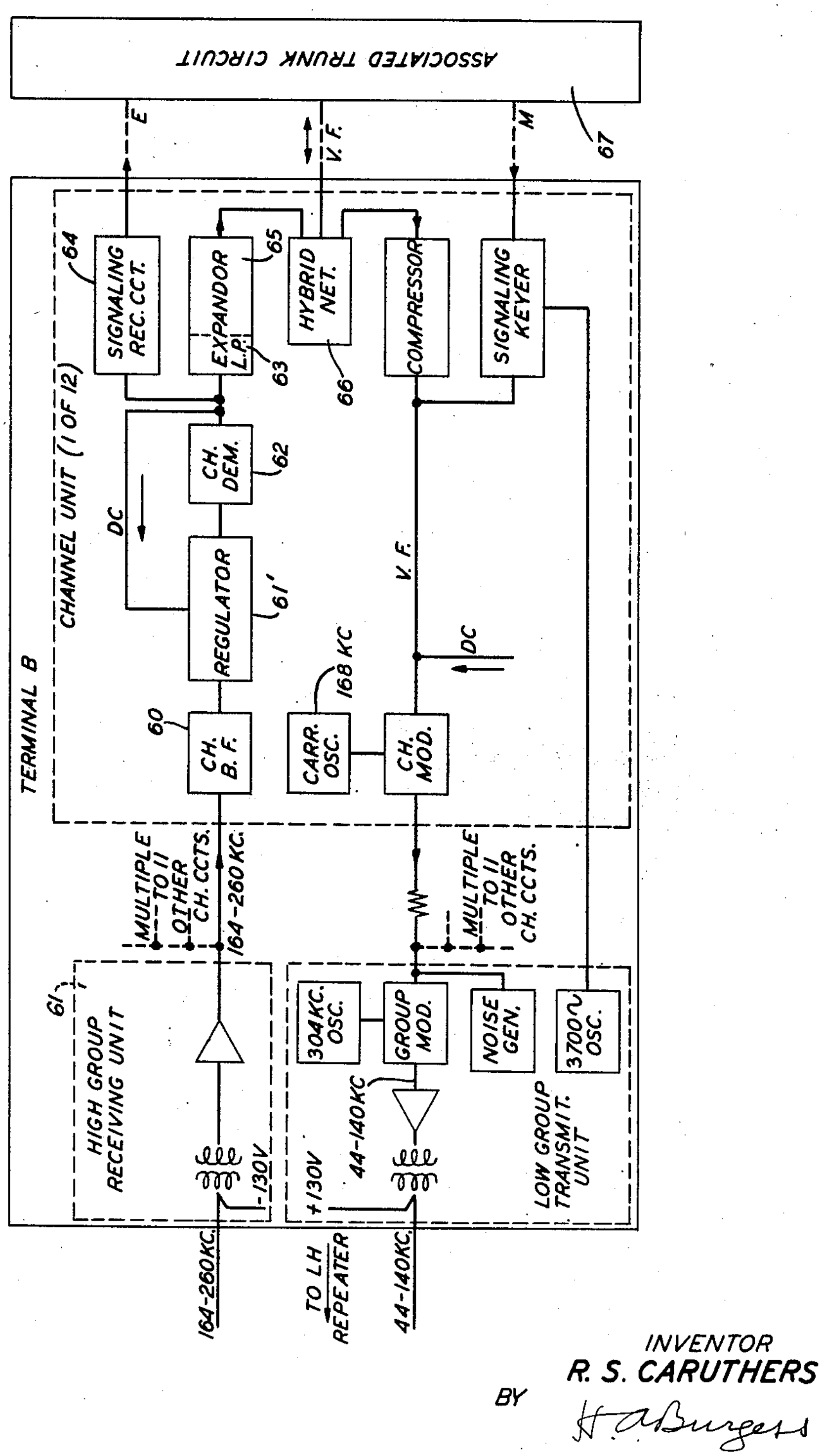

Fig. 6 shows the far-end terminal station B, receiving the 164–260 kilocycle band of carrier signals and transmitting the oppositely directed 44–140 kilocycle band.

The channel band filters 60 select their specific channel out of the group of 12 channels received from the group receiving unit 61. As shown, these selecting filters are multipled to 11 other channel circuits to separate the 12 carrier channels according to the scheme of Fig. 3A. The band-pass filters 60 pass the desired carrier and its double sidebands to the input of the channel regulator. A regulator 61' provides automatic gain control in order to maintain a fixed level at the input to the channel demodulator 62. The regulator consists of a two-stage amplifier whose gain is inversely proportional to its input level. The gain control is obtained by using part of the direct-current voltage obtained from rectified carrier at the output of the demodulator 62 as bias for the first stage.

Regulation by regulator 61' is obtained as follows: an increase in carrier input to the regulator 61' increases the regulator output, which results in more direct-current voltage output of the demodulator 62. This makes the bias on the first tube's grid more negative, reducing the gain of the first stage and restoring the output of the regulator close to its former value. A decrease in carrier input to the regulator gives the opposite effect. In this manner, it serves to compensate for changes in the magnitude of the received speech sideband and carrier levels due to line variations.

The demodulator 62 converts the channel carrier and its sideband currents back to voice frequencies.

The demodulator 62 consists of varistor units connected as a full wave balanced detector similar to that disclosed in United States Patent 2,086,601, issued July 13, 1937, to R. S. Caruthers.

Following demodulation, speech currents are passed through a receiving low-pass filter 63. This filter blocks from the expander circuit and voice frequency circuit output all 3700-cycle signaling currents, which are directed to the signaling receiving circuit 64, and it also eliminates 8-kilocycle tone resulting from beats between adjacent channel carrier frequencies.

The expander circuit 65 performs a function complementary to that of the compressor 21. In it, speech signals having a volume range one half as great as normal due to having been compressed at terminal A are thereby expanded into their normal range of volumes. This is accomplished by considerably attenuating the low volumes and slightly amplifying the high volumes so that a listener at the expander output hears the normal volume range. Thus, line noise and cross-talk are also reduced in volume in the interval between speech bursts and during weak speech passages.

The expander 65 may be of the type disclosed in an article entitled "Vario-Losser Circuits," by W. R. Bennett and S. Doba in Electrical Engineering, vol. 60, pages 17 to 22, inclusive, January 1941, or in United States Patent 2,018,489, issued October 22, 1935, to S. Doba.

The expander circuit, besides the low-pass filter 63, comprises a vario-losser made up of germanium varistor units, a rectifier control circuit, and the usual feedback amplifier and associated apparatus.

The speech signals which leave the expander pass through a hybrid network 66 and thence to the trunk circuit 67.

Speech transmission over the short haul multichannel carrier system has been described in detail for one direction of transmission. The transmission of speech in the opposite direction is substantially identical as regards components and operations, as evidenced by the symmetry disclosed in Figs. 4, 5, and 6.

While the invention has been disclosed in connection with four-wire transmission through a single cable, it should be obvious to those skilled in the art that the frequency frogging, inversion of channel order, and the use of compandors to cheapen the cost of the multichannel carrier system and permit higher level operation of its components may be equally well applied to open-wire transmission.

Although the carrier system has been described particularly with respect to speech transmission, it is within the purview of the invention to utilize the principles of the invention for amplitude modulation telegraphy and frequency shift telegraphy over carrier channels. Likewise, the system disclosed may be variously adapted to supplying multichannels for radio links, coaxial lines, and the like.

What is claimed is:

1. In combination, a pair of terminal stations connected by a multiplicity of conductor pairs in cross-talking relation to each other, a first four-wire multichannel carrier system linking said terminal stations and comprising a first group of said conductor pairs, a second four-wire carrier system comprising a second group of said conductor pairs, each of said four-wire systems comprising, at one of said terminal stations, a transmitting branch, means in said transmitting branch to establish in one pair of said first group of conductor pairs a group of outgoing carrier message channels disposed in predetermined frequency order in a first frequency range, and a receiving branch having means to receive from another pair of said first group of conductor pairs, respectively, corresponding incoming carrier message channels disposed in reversed frequency order in an adjacent frequency range, said systems having respective two-way four-wire amplifying repeaters at at least one common point between said terminal stations, certain of said conductor pairs extending uninterruptedly through said common point, thereby tending to aggravate near-end cross-talk, each of said repeaters having means to translate the channels incoming from both directions from their respective positions in one of said frequency ranges to their positions, in reversed frequency order, in the other of said frequency ranges, whereby near-end cross-talk via said certain conductor pairs is substantially eliminated, and a compressor included in the terminal transmitting branch of each of said systems and a complementary expander in the terminal receiving branch to reduce far-end cross-talk to a tolerable value.

2. In a four-wire repeatered carrier wave communication system utilizing separate circuits in cross-talking relation with each other for each of the two sides of the four-wire system, a repeater station comprising an individual one-way amplifying frequency-translating device connected in each of said circuits, an uninterrupted tertiary circuit extending through and in both directions from said station in cross-talking relation with said separate circuits, each of said devices having means to receive from its connected circuit input carrier signals sequentially allocated and occupying a first board frequency range and to deliver said signals to its connected circuit in inverted frequency sequence in a second broad frequency range adjacent the first, and terminal stations for said system including individual compandors for each said side, each of said compandors comprising a compressor at one of said terminal stations and an expander at the other.

3. A multichannel carrier wave transmission system comprising terminal stations and repeater stations, each terminal station transmitting in one direction a high frequency band divided into multichannel modulated carrier frequencies arranged in sequential order and receiving a low frequency band of equal width similarly divided into multichannel frequencies, a frequency converter at each terminal station for converting one band into the other, each repeater station provided with frequency converters for interchanging the high and low frequency bands passing therethrough, and a compressor and expander in each terminal station, each compressor together with the expander at the respective other terminal station forming a compandor for reducing the intermodulation interference derived from the non-linearity of said converters.

References Cited in the file of this patent

UNITED STATES PATENTS

| Number | Name | Date |
|---|---|---|
| 1,607,682 | Martin | Nov. 23, 1926 |
| 1,678,203 | Smythe | July 24, 1928 |